Oct. 24, 1967　　　　E. MEYER　　　　3,348,489
INDUCTION PUMP
Filed Dec. 13, 1965
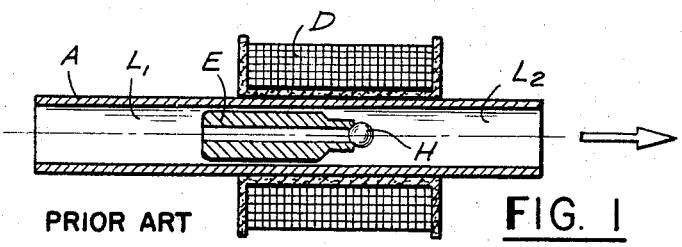
PRIOR ART　　FIG. 1
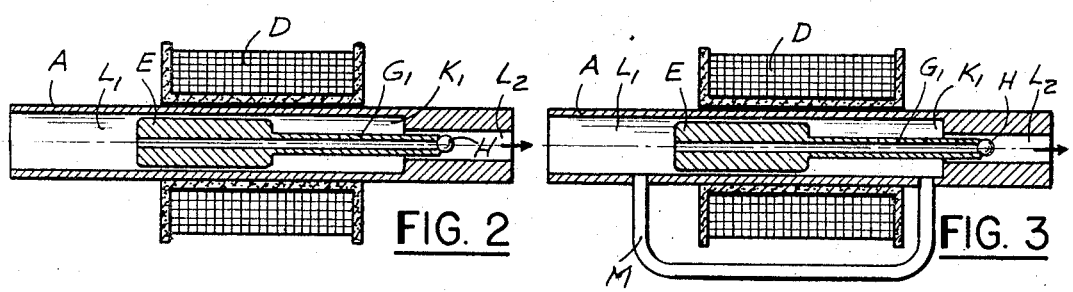
FIG. 2　　　　FIG. 3
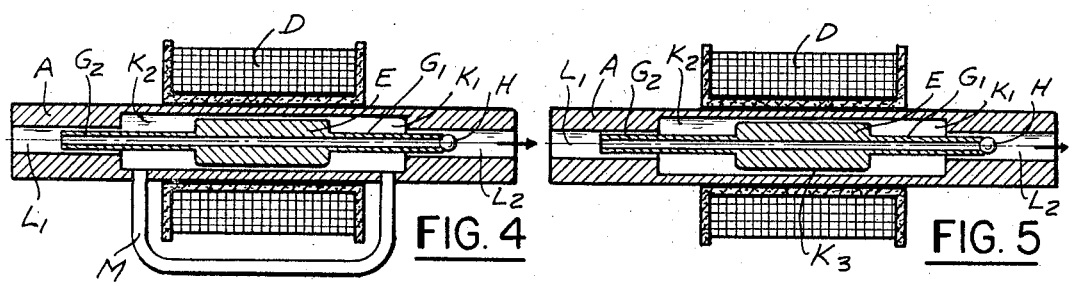
FIG. 4　　　　FIG. 5
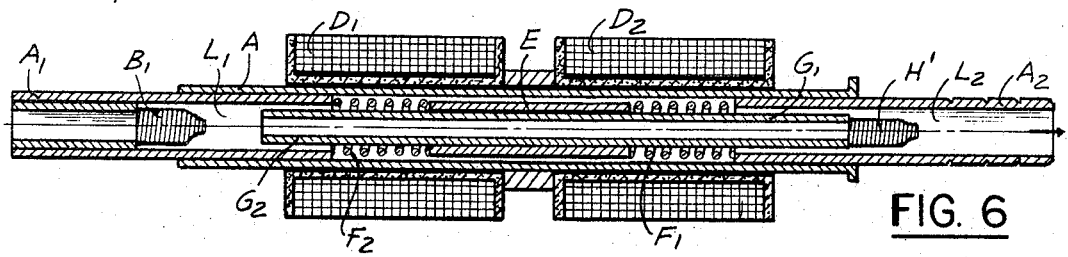
FIG. 6
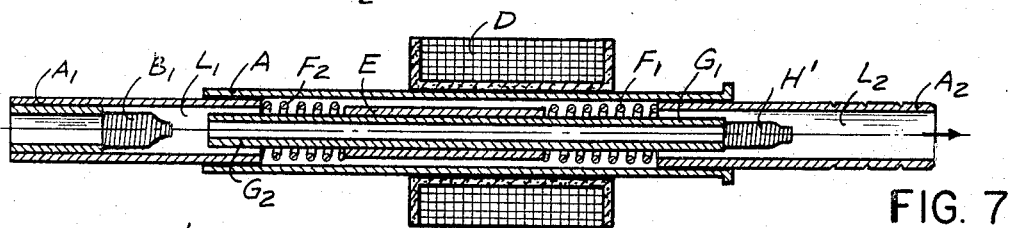
FIG. 7
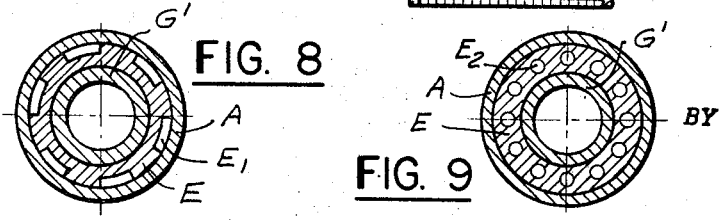
FIG. 8　　FIG. 9
INVENTOR
ERNST MEYER
BY Hane and Nydick
ATTORNEYS United States Patent Office 3,348,489
Patented Oct. 24, 1967

3,348,489
INDUCTION PUMP
Ernst Meyer, Rodernstrasse 12, Offenbach
am Main, Germany
Filed Dec. 13, 1965, Ser. No. 513,510
Claims priority, application Germany, Jan. 21, 1965,
M 63,868
8 Claims. (Cl. 103—53)

ABSTRACT OF THE DISCLOSURE

An induction pump capable of pumping large volumes of a flowable medium such as water at a high pressure. The pump has a cylinder open at both ends; one end constitutes a suction conduit and the other a pressure conduit. An electro-magnetically controlled tubular plunger defines an open passageway between the two end faces of the plunger. The plunger has a tubular extension of lesser diameter than the outer diameter of the plunger on each end. The extensions protrude into the conduits formed by the cylinder.

The present invention relates to an induction pump, that is, to a pump in which the pmping action is obtained by the stroke of a reciprocating plunger activated by a suitably controlled magnetic field rather than by the action of the rotor of an electric motor. More particularly, the invention relates to an induction pump in which the suction conduit and the pressure conduit are disposed in alignment with the direction of the stroke of the plunger.

Induction pumps of the general kind above referred to have the disadvantage that the stroke length of the plunger is dependent on the vacuum and pressure conditions prevailing during operation of the pump. There is a tendency of the plunger to wander out of the saturated magnetic field in response to certain changes in the operational suction and pressure conditions and to move into a position in which a condition of equilibrium exists between the magnetic attraction and the pressure acting upon the plunger. Obviously, when such condition of equilibrium exists, the pumping action ceases. As a result, induction pumps with axially aligned suction and pressure conduits, while capable of pumping substantial volumes of a flowable medium, are suitably only for pumping at low pressure.

It is a broad object of the invention to provide a novel and improved induction pump of the general kind above referred to which is suitable for pumping at high pressures without sacrificing the capability of pumping a substantial volume.

The aforementioned object, feature and advantage of the invention and other objects, features and advantages which will be pointed out hereinafter may be attained, for example, by elongating a tubular pump plunger at both ends by tubular extensions which are slidably guided in the suction conduit and the pressure conduit of the pump and which have a narrower outer diameter than the plunger. The plunger is so designed that it provides a passageway between its opposite ends to permit a flow of the medium to be pumped, such as a liquid, from one side to the other of the plunger in the pump cylinder. The pasasgeway may be formed by giving the plunger an outer diameter which is less than the inner diameter of the pump cylinder. The passageway may also be obtained by providing lengthwise grooves or ribs on the periphery of the plunger, or by lengthwise bores in the wall of the plunger.

The invention will be more fully described in connection with the accompanying drawing in which:

FIG. 1 is a sectional view of a prior art induction pump with aligned suction and pressure conduits;

FIG. 2 is a sectional view of an induction pump according to the invention;

FIG. 3 is a modification of an induction pump according to the invention;

FIG. 4 is another modification of the induction pump according to the invention;

FIG. 5 is still another modification of the induction pump;

FIG. 6 shows a sectional view of an induction pump according to the invention in greater detail;

FIG. 7 is a detailed sectional view of another modification of the pump;

FIG. 8 is a cross section of the plunger of an induction pump according to the invention; and FIG. 9 is a cross section of another modification of the plunger of the pump.

Turning first to FIG. 1 in detail, the prior art induction pump according to this figure comprises a cylinder A in which a tubular plunger E made of suitable magnetizable material is slidable. An exciting coil D encompasses the cylinder to effect the required reciprocating movements of the plunger in the cylinder by suitable control of the energizing circuit for the coil in a readily apparent manner. The control of the coil is not illustrated or described in detail; it is assumed to be conventional and does not constitute part of the invention. A one-way valve H, which is only diagrammatically indicated as it may be of any suitable and conventional design, such as a ball valve, is provided at one end of the plunger.

As it is apparent, the volume of liquid or other flowable medium to be pumped depends upon the cross sectional area of the plunger, the length of the stroke of the plunger and the frequency of the strokes. The cross sectional area of the plunger and the frequency of the strokes have constant values, assuming that the magnetic field acting upon the plunger is uniform and uniformly controlled. However, the length of the strokes depends upon the vacuum present at cylinder end portion L1 which constitutes the suction conduit of the pump and the pressure present at cylinder end portion L2 which constitutes the pressure conduit. When the pressure in pressure conduit L2 increases, the plunger moves toward suction conduit L1 and may leave the saturated magnetic field produced by coil D to an extent such that the plunger occupies a stable position of equilibrium in which the magnetic attraction and the counter pressure acting upon the plunger are in balance. If this occurs, the pumping action ceases, as already mentioned. The tendency of the plunger to wander out of the effective magnetic field of the coil into a position of equilibrium is the primary reason why conventional induction pumps are suitable for pumping at low pressure only.

FIG. 2 shows an induction pump structure in which a higher pumping pressure is obtained according to the invention by providing a tubular extension G1 which has a smaller outer diameter than plunger E and is slidably guided in a piston-like manner in suction conduit L2. As it is shown, the suction conduit is constricted to provide suitable internal guide means for plunger extension G1. The reduction of the cross sectional area from the diameter of plunger E to the diameter of extension G1 results theoretically in a proportional increase of the pressure in pressure conduit L2.

As can be seen in FIG. 2, the constriction in cylinder A in which extension G1 is guided and the respective face side of plunger E define a closed chamber K1. This closed chamber does not interfere with the operation of the plunger as long as it is substantially free of the liquid to be pumped, but if such liquid fills the chamber by creeping between the outer plunger wall and the inner cylinder wall, it will impede the movement of the plunger in the cylinder.

According to FIG. 3, a compression build-up in chamber K1 by the practically unavoidable ingress of liquid is relieved by a by-pass pipe M which connects the chamber with the suction conduit L1. While the arrangement of FIG. 3 is in many instances satisfactory, the pressure wave which is generated in conduit L1 by the influx of liquid from chamber K1 may interfere with a smooth and uniform flow of the liquid into suction conduit L1 from a supply of the liquid.

The pump structure of FIG. 4 provides that the suction side of the pump is constricted in the suction conduit L1 also, similar to the constriction in the pressure conduit L2 and plunger E is elongated in the direction of suction conduit L1 by an extension tube G2 which is slidably guided in the manner of a piston in the suction conduit. The two constrictions in conduits L1 and L2 now define two chamber portions K1 and K2 on opposite sides of the plunger. The two chamber portions are connected by by-pass pipe M.

When plunger E, in unison with extensions G1 and G2 is reciprocated in the middle portion of the cylinder, liquid creeping into chamber portions K1 and K2 can flow from one chamber portion into the other through by-pass pipe M.

The by-pass pipe avoids a build-up of pressure in either one of the chamber portions which, as stated before, tends to interfere with the smooth operation of the pump, but the eddy flows adjacent to the openings of pipe M in the chambers tend to have an unfavorable effect upon the smooth propagation of the pressure wave between the chamber portions K1 and K2.

FIG. 5 shows an arrangement in which pipe M is functionally replaced by providing a passageway K3 between the outer wall of plunger E and the inner wall of the mid-portion of cylinder A. Such passageway is obtained according to FIG. 5 by giving plunger E an outer diameter which is appreciably smaller than the inner diameter of the mid-portion of cylinder A.

The same result can be obtained, for instance, by providing lengthwise grooves E1 in the outer peripheral wall of the plunger, or conversely radially protruding lengthwise ribs as shown in FIG. 8, or according to FIG. 9, by providing one or several circumferentially spaced axial bores E2 in plunger E.

In actual practice, chambers K1 and K2 are always filled with liquid, when and while the pump is in operation. However, due to passageway K3, liquid can freely flow from one chamber portion to the other as the plunger reciprocates.

It is general practice to retain plunger E in cylinder A in a predetermined position in reference to exciting coil D by suitable means such as a permanent magnet and pressure or tension springs. The liquid to be pumped limits the length of the stroke to the length of the normal working stroke. However, if for any reason there is no liquid in the cylinder, the stroke in pumps as heretofore known will become considerably longer and may damage the locating springs or other pump components by blocking action. As stated before, the plunger may even leave the saturated magnetic field. Obviously, damage to components of the pump or leaving of the magnetic field by the plunger renders the pump unusable.

With the pump structure according to FIG. 5, the liquid continuously present in chamber portions K1 and K2 will exert a considerable damping force upon plunger E, even if the liquid to be pumped is not supplied for any reason. Accordingly, blocking of the spring system and wandering of plunger E out of the saturated magnetic field of coil D are effectively prevented.

While FIGS. 2 to 5 show the pump diagrammatically, FIGS. 6 and 7 show practical designs of induction pumps according to the invention in detail. The same reference characters are used to designate corresponding components.

The pump according to FIG. 6 includes a spring F1 on the pressure side and a spring F2 on the suction side of the pump. As previously described, these springs serve to maintain the plunger in predetermined limit positions in reference to the magnetic field generated by two exciter coils D1 and D2. A one-way valve B', such as a conventional spring valve, is provided at the inner end of suction conduit L1 which is shown as a connector tube A1 fitted in cylinder A. The valve H' at the end of the plunger extension is also shown as a conventional spring valve. A similar connector tube A2 is provided on the pressure side of the pump.

FIG. 7 is similar to FIG. 6, except that only one coil means D is provided.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. An induction pump for pumping a flowable medium, said pump comprising an open ended cylinder, one end portion of the cylinder constituting a suction condut and the other a pressure conduit, exciting coil means encompassing the mid-portion of the cylinder, a magnetizable tubular plunger slidable in the mid-portion of said cylinder and including an open passageway extending between the two end faces of the plunger, said plunger having a tubular extension of lesser diameter than the outer diameter of the plunger on each end face in alignment with the hollow interior of the plunger, said extensions protruding into said end portions of the cylinder and being slidably guided therein.

2. An induction pump according to claim 1, wherein the diameter of the outer wall of said plunger is less than the inner diameter of the cylinder wall in the mid-portion of the cylinder thereby defining said passageway between said walls.

3. An induction pump according to claim 1, wherein said plunger has at least one lengthwise groove in its outer peripheral wall, said groove constituting said passageway.

4. An induction pump according to claim 1, wherein said plunger includes at least one lengthwise bore in its wall, said bore constituting said passageway.

5. An induction pump for pumping a flowable medium, said pump comprising an open ended cylinder, one end portion of the cylinder constituting a suction conduit and the other a pressure conduit, exciting coil means encompassing the mid-portion of the cylinder, a magnetizable tubular plunger slidable in the mid-portion of said cylinder, said plunger having an axial tubular extension of lesser outer diameter than the outer diameter of the plunger on each of its end faces in alignment with the hollow interior of the plunger, each of the end portions of the cylinder including guide means slidably guiding said extensions, said guide means defining chamber portions on opposite sides of the plunger, and said plunger including an open passageway extending between its two end faces to interconnect said chamber portions.

6. An induction pump according to claim 5, wherein the diameter of the outer plunger wall is less than the diameter of the inner wall of the cylinder at said mid-portion thereof to provide said open passageway between said two walls.

7. An induction pump according to claim 5, wherein said internal guide means in the end portions of the cylinder are formed by connector tubes inserted into the cylinder at said end portions.

8. An induction pump according to claim 7, wherein a spring means is interposed between the connector tube on the suction side and the plunger to limit movement of the plunger toward said connector tube.

References Cited

UNITED STATES PATENTS

| 1,822,242 | 9/1931 | Schongut | 103—53 |
| 2,293,684 | 7/1942 | Holthouse | 103—53 |

ROBERT M. WALKER, *Primary Examiner.*